Figure 2:

B. B. SCHNEIDER.

Glass Pane for Lamps and Lanterns.

No. 124,016.

Patented Feb. 27, 1872.

WITNESSES:
N. Bradford
P. Halsted.

Bennett B. Schneider
by J. J. Halsted
his Atty.

AM. PHOTO-LITHOGRAPHIC CO. N.Y (OSBORNE'S PROCESS.)

124,016

UNITED STATES PATENT OFFICE.

BENNETT B. SCHNEIDER, OF NEW YORK, N. Y.

IMPROVEMENT IN GLASS-LIGHTS OR PANES FOR LAMPS, LANTERNS, &c.

Specification forming part of Letters Patent No. 124,016, dated February 27, 1872.

SPECIFICATION.

*To all whom it may concern:*

Be it known that I, BENNETT B. SCHNEIDER, of the city, county, and State of New York, have invented an Improved Glass-Light or Pane for illuminating purposes, such as Lamps, Lanterns, &c.; and I do hereby declare that the following, taken in connection with the drawing which accompanies and forms part of this specification, is a description of my invention sufficient to enable those skilled in the art to practice it.

For ornamental illuminating purposes, such as hall or other lamps, lanterns, &c., there have been introduced cylindrical glass rods arranged in proper supports vertically and parallel to each other, and, if desired, of different colors; sometimes these rods have been tubular that they might be filled with colored liquids. For mere beauty of effect these styles are desirable, but the rods, however arranged, lend no strength to each other, and are easily broken, while there are certain to be slight open spaces between them, which destroy the continuity of the glass, expose to the view and to lateral currents of air the flame of the lamp or gas-light, and also mar the effect. To avoid these and other defects, and yet secure some of the desired radiant effects, pieces of glass have been molded resembling a series of such cylindrical rods, but united together at their sides; this avoids any open space or cracks between them, but makes the line of junction of the imitation cylinders slight and frail, and extremely liable to be broken by slight shocks, and thus destroy the whole piece or plate, as the vibrations under a blow meet at the angles or thinnest and most delicate parts.

Figure 3:
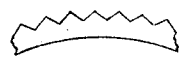
Figure 1:
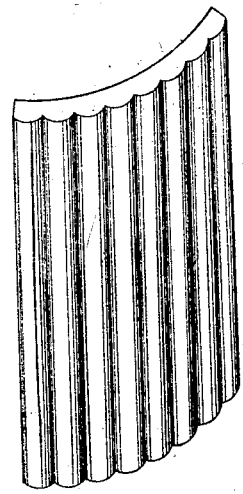
Figure 4:
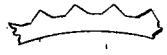
Figure 5:
Figure 6:
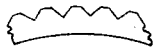
Figure 7:
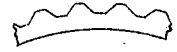
Figure 8:
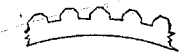

To avoid this difficulty among others, and, at the same time, to secure the requisite strength, I mold my plate in a metal or other form or mold which is smooth surfaced on its rear or inner side, and on its outer side in semblance of a series of connected parallel cylinders, producing a glass as shown in Figure 1. Such a glass I make either in sections of a circle, when designed for a circular lamp, or in an entire cylinder; in each case, however, the ribs are vertical, while the curve is in a horizontal plane; or, in other words, in a direction transverse of that of the length of the semicircular ribs. It will be evident that such a glass has all the strength due to a plain plate of a thickness equal to its thinnest part, and, in addition, that which the bars or ribs impart. And then when molded, as above, in the form of a cylinder or a section thereof, there is also gained the additional strength due to the arch form. The bar or rib, instead of being a section of a cylindrical rod, may be in the form of a section of a triangle, square, hexagon, octagon, &c., as taste may dictate, and as shown in end views or cross-sections in the drawing; and, instead of making the adjacent bars touch or meet at their sides, as shown in Figs. 1, 3, and 6, there may be a slight space between them, as in Figs. 2, 4, 5, 7, 8.

For lamps of forms other than circular, the plates may be molded flat instead of arched; and for a square, triangular, or other geometrical shape of lamp, the glass may be made of corresponding form entire in one piece, still preserving, however, my peculiarity of a plain or even surface within, and the described vertical ribs or bars on the exterior. The ribs or bars on the same plate need not be all of the same kind and size; in some cases the beauty will be enhanced by varying them, and thus breaking the uniformity.

I do not claim a mere irregular or undulating or wavy surface, as these would not produce the optical effect desired; but

I claim—

A glass for lamps and lanterns molded so as to represent on one side a series of straight parallel vertical rods or bars, the opposite side being smooth surfaced, forming a plane or planes, or curved into a circle or arc of a circle in a direction of a plane at right angles to the length of the bars, as shown and described.

BENNETT B. SCHNEIDER.

Witnesses:
G. H. BOUTON,
THOMAS GIBB.